United States Patent
Costa et al.

(10) Patent No.: US 11,290,701 B2
(45) Date of Patent: Mar. 29, 2022

(54) APPARATUS AND METHOD FOR DISTRIBUTING THREE DIMENSIONAL MEDIA CONTENT

(71) Applicant: AT&T Intellectual Property I, L.P., Atlanta, GA (US)

(72) Inventors: Pierre Costa, Austin, TX (US); Ahmad Ansari, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 98 days.

(21) Appl. No.: 16/257,930

(22) Filed: Jan. 25, 2019

(65) Prior Publication Data
US 2019/0174113 A1    Jun. 6, 2019

Related U.S. Application Data

(63) Continuation of application No. 14/688,125, filed on Apr. 16, 2015, now Pat. No. 10,237,533, which is a (Continued)

(51) Int. Cl.
*H04N 13/161* (2018.01)
*H04N 13/139* (2018.01)
(Continued)

(52) U.S. Cl.
CPC ......... *H04N 13/161* (2018.05); *H04N 13/139* (2018.05); *H04N 13/194* (2018.05);
(Continued)

(58) Field of Classification Search
CPC .... H04N 21/816; H04N 13/194; H04N 9/045; H04N 19/176; H04N 19/46;
(Continued)

(56) References Cited

U.S. PATENT DOCUMENTS

| 2,832,821 A | 4/1958 | Mont |
|---|---|---|
| 4,649,425 A | 3/1987 | Pund |

(Continued)

OTHER PUBLICATIONS

Edwards, "Active Shutter 3D Technology for HDTV", PhysOrg. com; 12 pages; Sep. 25, 2009; http://www.physorg.com/news173082582.html; web site last visited May 10, 2010.

*Primary Examiner* — David N Werner
(74) *Attorney, Agent, or Firm* — Guntin & Gust, PLC; Robert Gingher

(57) ABSTRACT

A system that incorporates teachings of the present disclosure may include, for example, a process that includes obtaining three-dimensional image content having first and second images. The first and second images include first and second numbers of pixels. The first and second images are arranged according to a shared coordinate system to portray different perspectives of a common scene. A first portion of pixels are removed from the first image based on a filtering of the first image, resulting in a first remaining number of pixels. A second portion of pixels are removed from the second image based on positions of the first portion of pixels in the shared coordinate system, resulting in a second remaining number of pixels. The first remaining portion of pixels is combined with the second remaining portion of pixels to form a transport frame for delivery to a media processor. Other embodiments are disclosed.

20 Claims, 9 Drawing Sheets

Related U.S. Application Data continuation of application No. 12/831,826, filed on Jul. 7, 2010, now Pat. No. 9,049,426.

(51) Int. Cl.
*H04N 13/194* (2018.01)
*H04N 13/218* (2018.01)
*H04N 13/156* (2018.01)
*H04N 13/337* (2018.01)
*H04N 13/341* (2018.01)

(52) U.S. Cl.
CPC ......... *H04N 13/218* (2018.05); *H04N 13/156* (2018.05); *H04N 13/337* (2018.05); *H04N 13/341* (2018.05)

(58) Field of Classification Search
CPC .. H04N 19/105; H04N 13/156; H04N 19/132; H04N 21/4345; H04N 21/4622; H04N 21/84; H04N 21/8456; H04N 2201/0086; H04N 2201/0089; H04N 13/178; H04N 19/91; H04N 13/161; H04N 13/305; H04N 13/341; H04N 13/359; H04N 19/119; H04N 19/124; H04N 19/129; H04N 19/136; H04N 19/172; H04N 19/182; H04N 19/20; H04N 19/23; H04N 13/139; H04N 7/012; H04N 13/218
See application file for complete search history.

(56) References Cited

U.S. PATENT DOCUMENTS

| | | | |
|---|---|---|---|
| 5,012,351 A | 4/1991 | Isono | |
| 5,293,529 A | 3/1994 | Yoshimura et al. | |
| 5,353,269 A | 10/1994 | Kobayashi et al. | |
| 5,392,266 A | 2/1995 | Kobayashi et al. | |
| 5,465,175 A | 11/1995 | Woodgate | |
| 6,014,164 A | 1/2000 | Woodgate | |
| 6,115,177 A | 9/2000 | Vossler | |
| 6,144,375 A | 11/2000 | Jain et al. | |
| 6,188,442 B1 | 2/2001 | Narayanaswami | |
| 6,243,054 B1 | 6/2001 | DeLuca | |
| 6,285,368 B1 | 9/2001 | Sudo | |
| 6,535,241 B1 | 3/2003 | McDowall | |
| 6,559,813 B1 | 5/2003 | DeLuca | |
| 6,654,721 B2 | 11/2003 | Handelman | |
| 6,725,463 B1 | 4/2004 | Birleson | |
| 6,859,549 B1 | 2/2005 | Oliensis | |
| 6,924,833 B1 | 8/2005 | McDowall | |
| 6,965,381 B2 | 11/2005 | Kitamura | |
| 7,002,618 B2* | 2/2006 | Lipton .................. | H04N 5/765 348/51 |
| 7,084,905 B1* | 8/2006 | Nayar .................. | H04N 5/235 348/222.1 |
| 7,106,358 B2 | 9/2006 | Valliath et al. | |
| 7,137,558 B2 | 11/2006 | Aigeldinger et al. | |
| 7,204,592 B2 | 4/2007 | O'Donnell | |
| 7,245,430 B2 | 7/2007 | Kobayashi et al. | |
| 7,327,410 B2 | 2/2008 | Cho et al. | |
| 7,391,443 B2 | 6/2008 | Kojima et al. | |
| 7,613,927 B2 | 11/2009 | Holovacs | |
| 7,785,201 B2 | 8/2010 | Hashimoto | |
| 7,813,543 B2 | 10/2010 | Modén | |
| 8,111,282 B2 | 2/2012 | Cutler et al. | |
| 8,117,281 B2 | 2/2012 | Robinson et al. | |
| 8,130,256 B2 | 3/2012 | Trachtenberg et al. | |
| 8,254,668 B2 | 8/2012 | Mashitani | |
| 8,284,230 B2 | 10/2012 | Jeong | |
| 8,305,914 B2 | 11/2012 | Thielman et al. | |
| 8,370,873 B2 | 2/2013 | Shintani | |
| 8,373,744 B2 | 2/2013 | Akka et al. | |
| 8,412,773 B1 | 4/2013 | Chapweske et al. | |
| 8,416,278 B2 | 4/2013 | Kim et al. | |
| 8,436,888 B1 | 5/2013 | Baldino et al. | |
| 8,438,502 B2 | 5/2013 | Friedman et al. | |
| 8,456,507 B1 | 6/2013 | Mallappa et al. | |
| 8,471,888 B2 | 6/2013 | George et al. | |
| 8,552,983 B2 | 10/2013 | Chiu | |
| 8,625,769 B1 | 1/2014 | Allen et al. | |
| 8,644,467 B2 | 2/2014 | Catchpole et al. | |
| 8,675,067 B2 | 3/2014 | Chou et al. | |
| 8,687,042 B2 | 4/2014 | Seshadri et al. | |
| 8,860,782 B2* | 10/2014 | Tsukagoshi ...... | H04N 21/23605 348/42 |
| 9,030,536 B2 | 5/2015 | King et al. | |
| 9,032,470 B2 | 5/2015 | Bedingfield, Sr. et al. | |
| 9,049,033 B2 | 6/2015 | Lemmey et al. | |
| 9,077,846 B2 | 7/2015 | Pradeep | |
| 9,325,943 B2 | 4/2016 | Wilson et al. | |
| 9,379,900 B2 | 6/2016 | Lemmey | |
| 9,830,680 B2 | 11/2017 | Meuninck et al. | |
| 2002/0009137 A1 | 1/2002 | Nelson | |
| 2002/0114072 A1 | 8/2002 | Hong et al. | |
| 2002/0122145 A1 | 9/2002 | Tung | |
| 2002/0122585 A1 | 9/2002 | Swift et al. | |
| 2003/0043262 A1 | 3/2003 | Takemoto | |
| 2003/0090592 A1 | 5/2003 | Callway et al. | |
| 2003/0128273 A1 | 7/2003 | Matsui | |
| 2003/0128871 A1 | 7/2003 | Naske et al. | |
| 2003/0132951 A1 | 7/2003 | Sorokin et al. | |
| 2003/0214630 A1 | 11/2003 | Winterbotham | |
| 2003/0223499 A1* | 12/2003 | Routhier ............. | H04N 13/339 375/240.25 |
| 2003/0231179 A1 | 12/2003 | Suzuki | |
| 2004/0013252 A1 | 1/2004 | Craner et al. | |
| 2004/0027452 A1 | 2/2004 | Yun | |
| 2004/0104864 A1 | 6/2004 | Nakada | |
| 2004/0109093 A1 | 6/2004 | Small-Stryker | |
| 2004/0130614 A1 | 7/2004 | Valliath et al. | |
| 2004/0150585 A1 | 8/2004 | Tomisawa et al. | |
| 2004/0164154 A1 | 8/2004 | Aigeldinger et al. | |
| 2004/0218104 A1 | 11/2004 | Smith | |
| 2004/0233275 A1 | 11/2004 | Tomita et al. | |
| 2005/0041163 A1* | 2/2005 | Butler-Smith ....... | G02B 26/008 348/744 |
| 2005/0041736 A1 | 2/2005 | Butler-Smith et al. | |
| 2005/0057702 A1 | 3/2005 | Cho et al. | |
| 2005/0066165 A1 | 3/2005 | Peled et al. | |
| 2005/0084006 A1 | 4/2005 | Lei | |
| 2005/0123171 A1 | 6/2005 | Kobayashi et al. | |
| 2005/0169553 A1 | 8/2005 | Maurer | |
| 2005/0185711 A1 | 8/2005 | Pfister | |
| 2005/0190180 A1 | 9/2005 | Jin et al. | |
| 2005/0270367 A1 | 12/2005 | McDowall | |
| 2006/0001596 A1 | 1/2006 | Cuffaro et al. | |
| 2006/0044388 A1* | 3/2006 | Kim .................... | H04N 13/156 348/42 |
| 2006/0046846 A1 | 3/2006 | Hashimoto | |
| 2006/0061652 A1 | 3/2006 | Sato et al. | |
| 2006/0109200 A1 | 5/2006 | Alden | |
| 2006/0136846 A1 | 6/2006 | Im et al. | |
| 2006/0139312 A1 | 6/2006 | Sinclair et al. | |
| 2006/0161410 A1 | 7/2006 | Hamatani et al. | |
| 2006/0200518 A1 | 9/2006 | Sinclair et al. | |
| 2006/0203085 A1 | 9/2006 | Tomita | |
| 2006/0252978 A1 | 11/2006 | Vesely | |
| 2006/0274197 A1 | 12/2006 | Yoo | |
| 2007/0039032 A1 | 2/2007 | Goldey et al. | |
| 2007/0052672 A1 | 3/2007 | Ritter et al. | |
| 2007/0153122 A1 | 7/2007 | Ayite | |
| 2007/0171275 A1 | 7/2007 | Kenoyer | |
| 2007/0216828 A1 | 9/2007 | Jacobs | |
| 2007/0242068 A1 | 10/2007 | Han | |
| 2007/0250567 A1 | 10/2007 | Erion et al. | |
| 2007/0263003 A1 | 11/2007 | Ko | |
| 2007/0266412 A1 | 11/2007 | Trowbridge | |
| 2007/0296721 A1 | 12/2007 | Chang et al. | |
| 2008/0015997 A1 | 1/2008 | Moroney et al. | |
| 2008/0024454 A1 | 1/2008 | Everest | |
| 2008/0044079 A1 | 2/2008 | Chao et al. | |
| 2008/0052759 A1 | 2/2008 | Kronlund et al. | |
| 2008/0062125 A1 | 3/2008 | Kitaura | |

(56) References Cited

U.S. PATENT DOCUMENTS

| | | |
|---|---|---|
| 2008/0068372 A1 | 3/2008 | Krah |
| 2008/0080852 A1 | 4/2008 | Chen |
| 2008/0100547 A1 | 5/2008 | Cernasov |
| 2008/0151092 A1 | 6/2008 | Vilcovsky et al. |
| 2008/0170123 A1 | 7/2008 | Albertson et al. |
| 2008/0186308 A1* | 8/2008 | Suzuki ............... H04N 13/398 345/419 |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1 | 10/2008 | Chen |
| 2008/0303895 A1* | 12/2008 | Akka ................. H04N 13/139 348/49 |
| 2008/0303896 A1* | 12/2008 | Lipton ............... H04N 13/161 348/49 |
| 2008/0310499 A1 | 12/2008 | Kim |
| 2009/0033737 A1 | 2/2009 | Goose et al. |
| 2009/0046895 A1 | 2/2009 | Pettersson et al. |
| 2009/0096858 A1 | 4/2009 | Jeong et al. |
| 2009/0097771 A1 | 4/2009 | Jiang et al. |
| 2009/0100474 A1 | 4/2009 | Migos |
| 2009/0122134 A1 | 5/2009 | Joung et al. |
| 2009/0128620 A1* | 5/2009 | Lipton ............... H04N 19/597 348/42 |
| 2009/0160934 A1 | 6/2009 | Hendrickson et al. |
| 2009/0174708 A1 | 7/2009 | Yoda et al. |
| 2009/0221368 A1 | 9/2009 | Yen et al. |
| 2009/0278917 A1 | 11/2009 | Dobbins et al. |
| 2009/0304265 A1 | 12/2009 | Khan et al. |
| 2009/0310851 A1 | 12/2009 | Areas et al. |
| 2009/0315977 A1 | 12/2009 | Jung |
| 2009/0319178 A1 | 12/2009 | Khosravy |
| 2009/0327418 A1 | 12/2009 | Zhang et al. |
| 2010/0007582 A1 | 1/2010 | Zalewski et al. |
| 2010/0013738 A1 | 1/2010 | Covannon et al. |
| 2010/0026783 A1 | 2/2010 | Chiu et al. |
| 2010/0026809 A1 | 2/2010 | Curry et al. |
| 2010/0031202 A1 | 2/2010 | Morris et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073454 A1 | 3/2010 | Lovhaugen et al. |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085416 A1 | 4/2010 | Hegde et al. |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0103822 A1 | 4/2010 | Montwill et al. |
| 2010/0114783 A1 | 5/2010 | Spolar |
| 2010/0134411 A1 | 6/2010 | Tsumura |
| 2010/0150523 A1 | 6/2010 | Okubo |
| 2010/0165079 A1* | 7/2010 | Yamada ............. H04N 13/161 348/43 |
| 2010/0171697 A1 | 7/2010 | Son et al. |
| 2010/0171814 A1 | 7/2010 | Routhier et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0212509 A1 | 8/2010 | Tien et al. |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0228825 A1 | 9/2010 | Hegde et al. |
| 2010/0235871 A1 | 9/2010 | Kossin |
| 2010/0238273 A1 | 9/2010 | Luisi et al. |
| 2010/0241999 A1 | 9/2010 | Russ et al. |
| 2010/0250120 A1 | 9/2010 | Waupotitsch et al. |
| 2010/0303442 A1 | 12/2010 | Newton et al. |
| 2010/0306800 A1 | 12/2010 | Jung et al. |
| 2010/0309287 A1 | 12/2010 | Rodriguez |
| 2010/0315494 A1 | 12/2010 | Ha et al. |
| 2010/0328475 A1 | 12/2010 | Thomas et al. |
| 2011/0001806 A1 | 1/2011 | Nakahata |
| 2011/0012896 A1 | 1/2011 | Ji |
| 2011/0012992 A1 | 1/2011 | Luthra |
| 2011/0019669 A1 | 1/2011 | Ma et al. |
| 2011/0029893 A1 | 2/2011 | Roberts et al. |
| 2011/0032328 A1 | 2/2011 | Raveendran et al. |
| 2011/0037837 A1 | 2/2011 | Chiba et al. |
| 2011/0043614 A1 | 2/2011 | Kitazato |
| 2011/0050851 A1* | 3/2011 | Chen .................. H04N 13/139 348/43 |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0081023 A1 | 4/2011 | Raghuvanshi et al. |
| 2011/0085017 A1 | 4/2011 | Robinson et al. |
| 2011/0096155 A1 | 4/2011 | Choo |
| 2011/0109715 A1 | 5/2011 | Jing et al. |
| 2011/0115890 A1 | 5/2011 | Kim et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0122220 A1 | 5/2011 | Roberts et al. |
| 2011/0128354 A1 | 6/2011 | Tien et al. |
| 2011/0138334 A1 | 6/2011 | Jung |
| 2011/0149035 A1* | 6/2011 | Tsukagoshi .......... H04N 13/156 348/43 |
| 2011/0149040 A1* | 6/2011 | Klebanov ........... H04N 13/139 348/46 |
| 2011/0157329 A1 | 6/2011 | Huang et al. |
| 2011/0164110 A1 | 7/2011 | Fortin et al. |
| 2011/0164111 A1 | 7/2011 | Karaoguz et al. |
| 2011/0164122 A1 | 7/2011 | Hardacker |
| 2011/0169913 A1 | 7/2011 | Karaoguz et al. |
| 2011/0187821 A1 | 8/2011 | Routhier et al. |
| 2011/0193946 A1 | 8/2011 | Apitz |
| 2011/0199469 A1 | 8/2011 | Gallagher |
| 2011/0211049 A1 | 9/2011 | Bassali et al. |
| 2011/0216153 A1 | 9/2011 | Tasker et al. |
| 2011/0221874 A1 | 9/2011 | Oh |
| 2011/0221897 A1 | 9/2011 | Haddick et al. |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0254929 A1* | 10/2011 | Yang .................. G02B 30/24 348/51 |
| 2011/0255003 A1 | 10/2011 | Pontual |
| 2011/0258665 A1 | 10/2011 | Fahrny et al. |
| 2011/0267422 A1 | 11/2011 | Garcia et al. |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033041 A1* | 2/2012 | Nagaraj ............. H04N 19/597 348/43 |
| 2012/0033048 A1 | 2/2012 | Ogawa |
| 2012/0050456 A1 | 3/2012 | Arnao et al. |
| 2012/0050458 A1 | 3/2012 | Mauchly et al. |
| 2012/0050507 A1 | 3/2012 | Keys |
| 2012/0069015 A1* | 3/2012 | Han .................... G09G 3/003 345/419 |
| 2012/0075407 A1 | 3/2012 | Wessling et al. |

(56) References Cited

U.S. PATENT DOCUMENTS

| | | |
|---|---|---|
| 2012/0075438 A1* | 3/2012 | Kikkawa .............. H04N 21/431 348/54 |
| 2012/0092445 A1 | 4/2012 | McDowell et al. |
| 2012/0114260 A1* | 5/2012 | Takahashi ............ H04N 13/156 382/238 |
| 2012/0128322 A1 | 5/2012 | Shaffer et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0212509 A1 | 8/2012 | Benko et al. |
| 2012/0249719 A1 | 10/2012 | Lemmey et al. |
| 2012/0249741 A1 | 10/2012 | Maciocci et al. |
| 2012/0274731 A1 | 11/2012 | Shanmukhadas et al. |
| 2012/0281069 A1* | 11/2012 | Nishio ................ H04N 13/161 348/43 |
| 2012/0307153 A1* | 12/2012 | Terai ................... H04N 13/161 348/571 |
| 2012/0327174 A1 | 12/2012 | Hines et al. |
| 2012/0327178 A1 | 12/2012 | Hines et al. |
| 2013/0070045 A1 | 3/2013 | Meek et al. |
| 2013/0120522 A1 | 5/2013 | Lian et al. |
| 2013/0271560 A1 | 10/2013 | Diao et al. |
| 2013/0307942 A1 | 11/2013 | Dini et al. |
| 2016/0142698 A1 | 5/2016 | Hines |
| 2016/0243442 A1 | 8/2016 | Friedman |
| 2016/0269722 A1 | 9/2016 | King et al. |
| 2016/0309117 A1 | 10/2016 | Hines et al. |
| 2016/0323546 A1 | 11/2016 | Hines |
| 2016/0344976 A1 | 11/2016 | Hines et al. |
| 2017/0150098 A1 | 5/2017 | Hines |
| 2017/0230727 A1 | 8/2017 | Meuninck |
| 2017/0318278 A1 | 11/2017 | Hines et al. |
| 2017/0353715 A1 | 12/2017 | King et al. |
| 2018/0068415 A1 | 3/2018 | Meuninck et al. |
| 2018/0309958 A1 | 10/2018 | Hines et al. |
| 2018/0343503 A1 | 11/2018 | Meuninck et al. |

\* cited by examiner

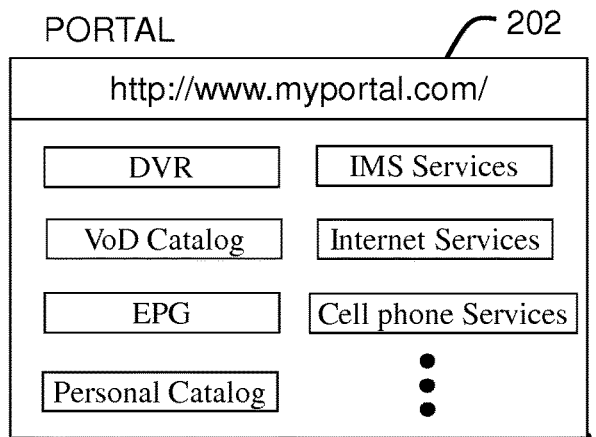
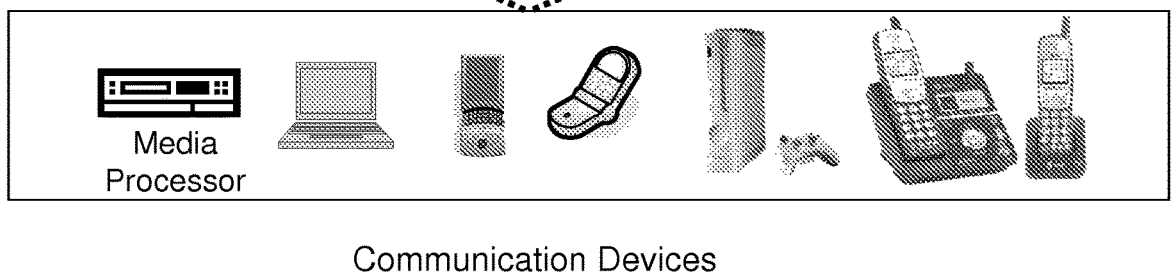
Communication Devices
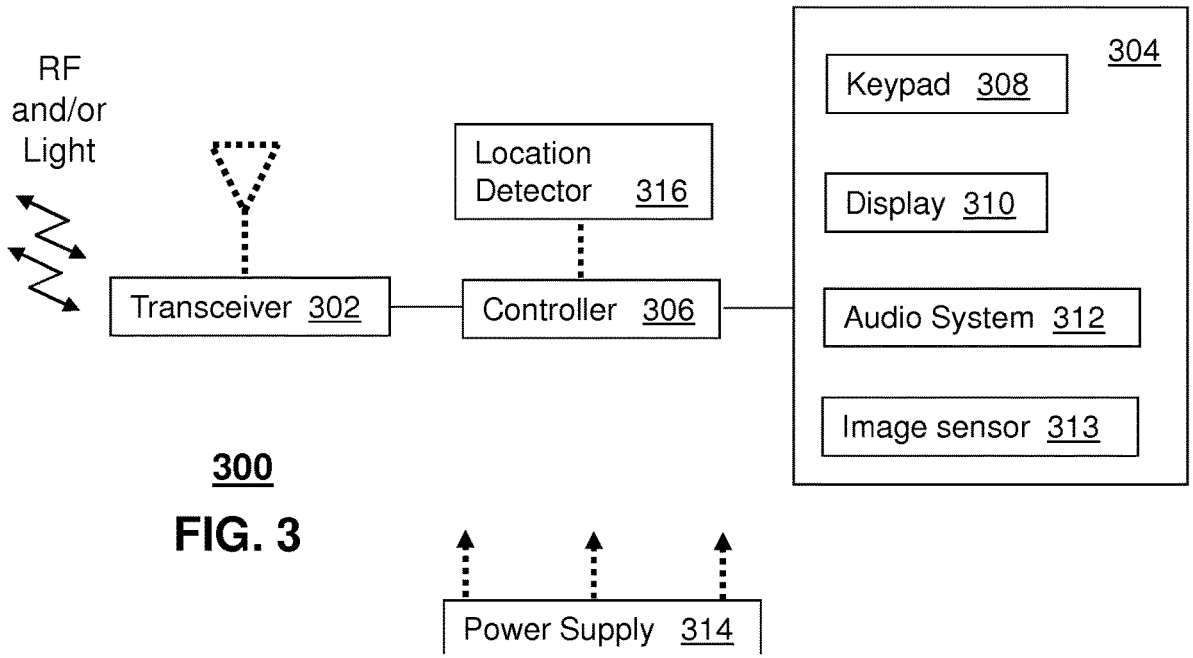
FIG. 3

400

500

Polarized Display

600

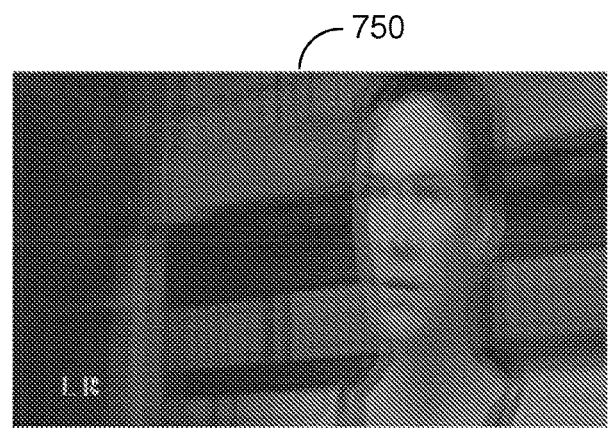
700
FIG. 7

800

1000

APPARATUS AND METHOD FOR DISTRIBUTING THREE DIMENSIONAL MEDIA CONTENT

CROSS-REFERENCE TO RELATED APPLICATION(S)

This application is a continuation of U.S. patent application Ser. No. 14/688,125 filed Apr. 16, 2015, which is a continuation of and claims priority to U.S. patent application Ser. No. 12/831,826 filed Jul. 7, 2010, now U.S. Pat. No. 9,049,426. The contents of each of the foregoing are hereby incorporated by reference into this application as if set forth herein in full.

FIELD OF THE DISCLOSURE

The present disclosure relates generally to media content communication and more specifically to an apparatus and method for distributing three-dimensional media content.

BACKGROUND

Media consumption has become a multibillion dollar industry that continues to grow rapidly. High resolution displays are being introduced into the marketplace that can now present movies and games with three-dimensional perspective having clarity never seen before.

As the quality of the media content is improving, the bandwidth requirements for consumers is increasing. Also, the load on networks to transport the media content is increasing.

BRIEF DESCRIPTION OF THE DRAWINGS

FIG. 2 depicts an illustrative embodiment of a portal interacting with the communication system of FIG. 1;

FIG. 3 depicts an illustrative embodiment of a communication device utilized in the communication system of FIG. 1;

FIGS. 7-9 depict illustrative embodiments of frames of media content that can be transported using the system and devices of FIGS. 1-6;

DETAILED DESCRIPTION

One embodiment of the present disclosure can entail a server having a controller to receive three-dimensional (3D) image content that has a plurality of left eye frames and a plurality of right eye frames. Each left eye frame of the plurality of left eye frames can have a first image that corresponds with a second image of a right eye frame of the plurality of right eye frames, and the corresponding first and second images can be at different perspectives. The controller can be operable to remove a portion of pixels from each left eye frame and from the corresponding right eye frame and combine remaining pixels from each left eye frame of the plurality of left eye frames with remaining pixels from the corresponding right eye frame of the plurality of right eye frames, The combined remaining pixels can form a plurality of transport frames, and can form an alternating pattern of pixels based on either alternating rows of pixels or alternating columns of pixels from each left eye frame and the corresponding right eye frame. The controller can also be operable to encode the plurality of transport frames and transmit the encoded plurality of transport frames over an Internet Protocol Television network for decoding by a media processor into the 3D image content.

One embodiment of the present disclosure can entail a non-transitory computer-readable storage medium operating in a media processor, where the storage medium includes computer instructions to receive a plurality of transport frames and generate a left eye frame and a right eye frame from each of the plurality of transport frames. The left eye frame can be generated from first alternating rows of pixels or first alternating columns of pixels of each of the plurality of transport frames. The right eye frame can be generated from second alternating rows of pixels or second alternating columns of pixels of each of the plurality of transport frames. The computer instructions can also include presenting three-dimensional content on a display device using the generated left and right eye frames.

One embodiment of the present disclosure can entail a method including obtaining 3D image content having a plurality of left eye frames and a plurality of right eye frames. The method can also include interleaving pixels from each left eye frame of the plurality of left eye frames with pixels from the corresponding right eye frame of the plurality of right eye frames in an alternating fashion to form a plurality of transport frames for delivery to a media processor.

Figure 1:
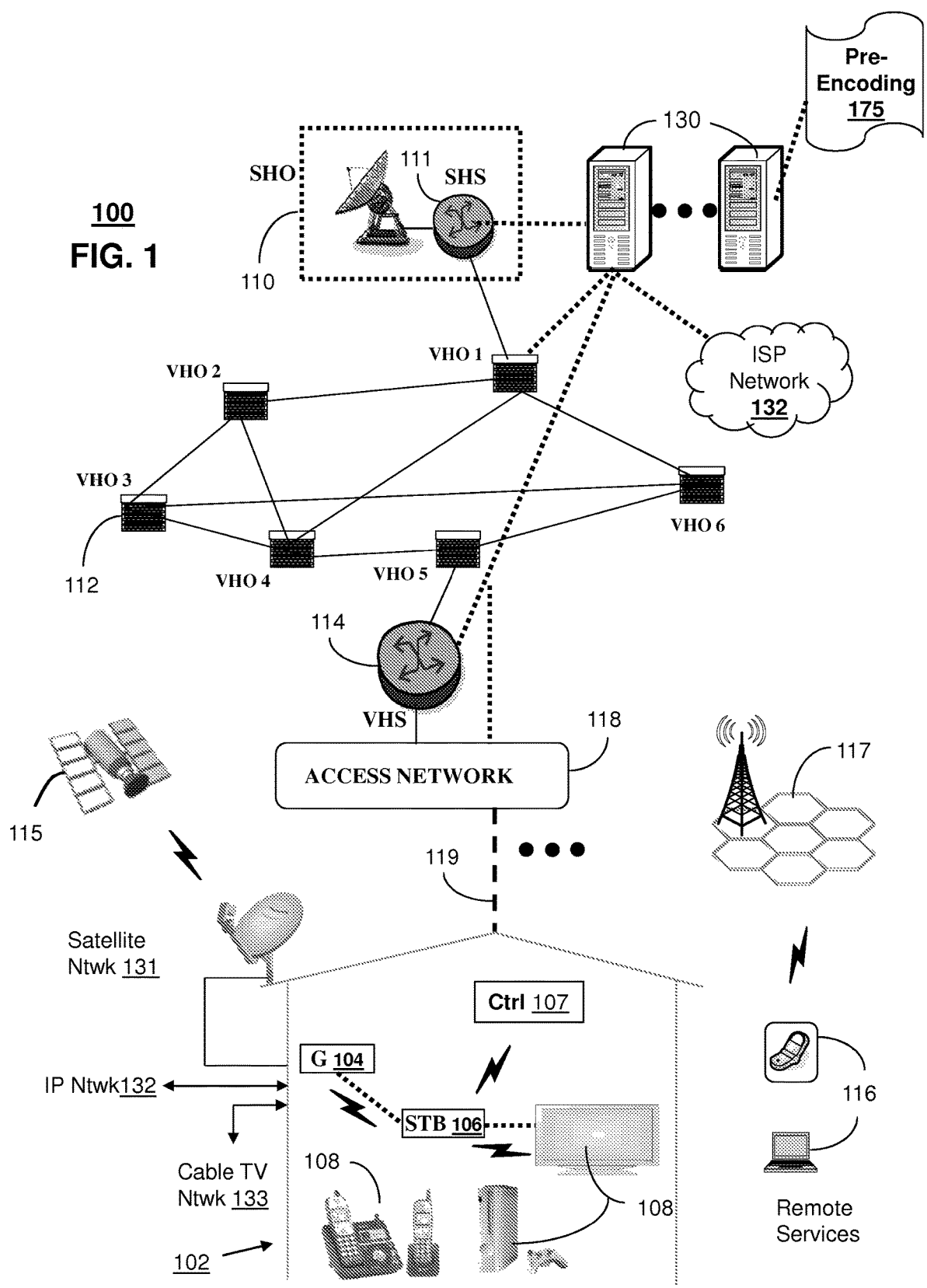
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system, although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provides broadband services over optical links or copper twisted pairs 119 to buildings 102. The gateway 104 can use common communication technology to distribute broadcast signals to media processors 106 such as Set-Top Boxes (STBs) or gaming consoles, which in turn present broadcast channels to media devices 108 such as computers, television sets, managed in some instances by a media controller 107 (such as an infrared or RF remote control, gaming controller, etc.).

The gateway 104, the media processors 106, and media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services. The present disclosure also contemplates delivery of media content to a plurality of display devices without using set top boxes. For instance, the gateway 104 can receive media content in various formats and convert the media content into a format that is compatible with the display devices, such as the Digital Living Network Alliance standard.

Some of the network elements of the IPTV media system can be coupled to one or more computing devices 130. The computing devices 130, or a portion thereof, can operate as a web server for providing portal services over an Internet Service Provider (ISP) network 132 to wireline media devices 108 or wireless communication devices 116 (e.g., cellular phone, laptop computer, etc.) by way of a wireless access base station 117. The base station 117 can operate according to common wireless access protocols such as WiFi, or cellular communication technologies (such as GSM, CDMA, UMTS, WiMAX, Software Defined Radio or SDR, and so on).

A satellite broadcast television system can be used in place of, or in addition to, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the ISP network 132 to enable services such as VoD and EPG described above.

In yet another embodiment, an analog or digital broadcast distribution system such as cable TV system 133 can be used in place of, or in addition to, the IPTV media system described above. In this embodiment the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

The computing devices 130 can include a controller 175 for pre-encoding 3D image content prior to delivery to the gateway 104 and/or media processors 106. For instance, the computing devices 130 can apply pre-compression geometric re-arranging of pixels in the frames that make up the 3D content in order to increase the pixel-to-pixel correlation. By increasing the pixel correlation, standard spatial frequency transform methods (e.g., H.264 protocol) can yield more efficient compression. Additional compression gains may be accomplished since there is no hard discontinuity in the middle of the frame. In one embodiment, the removal or reduction of discontinuity in the frame can facilitate tracking macroblocks for motion-based algorithms.

In one embodiment, the computing devices 130 can receive left and right eye pairs of the 3D content and can combine the pairs into single frames for compression and transport. For example, portions of the pixels in each of the pairs can be removed, such as alternating rows or alternating columns, and then the resulting frame can be generated by providing the frame with rows of pixels or columns of pixels that are selected from the left and right eye pairs in an alternating fashion. In one embodiment, the resulting content can be encoded to generate a plurality of transport frames, which can be delivered to the media processors 106 in a single stream.

The 3D image content can be in various forms, including still images, moving images and video games. The computing devices can receive or otherwise obtain the 3D content in a number of different ways, including via broadcast.

In another embodiment the pre-encoding can be performed by the computing devices 130 in real-time. The 3D image content can be presented by the media processor 106 and the display device 108 using various techniques including polarization, anaglyphics, active shuttering (such as alternate frame sequencing), autostereoscopy, and so forth.

FIG. 2 depicts an illustrative embodiment 200 of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser using an Internet-capable communication device such as those illustrated FIG. 1. The portal 202 can be configured, for example, to access a media processor 106 and services managed thereby such as a Digital Video Recorder (DVR), a VoD catalog, an EPG, a video gaming profile, a personal catalog (such as personal videos, pictures, audio recordings, etc.) stored in the media processor, to provision IMS services described earlier, to provision Internet services, provisioning cellular phone services, and so on.

FIG. 3 depicts an exemplary embodiment of a communication device 300. Communication device 300 can serve in whole or in part as an illustrative embodiment of the communication devices of FIG. 1 and other communication devices described herein. The communication device 300 can comprise a wireline and/or wireless transceiver 302 (herein transceiver 302), a user interface (UI) 304, a power supply 314, a location detector 316, and a controller 306 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a QWERTY keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310.

The UI 304 can also include an audio system 312 that utilizes common audio technology for conveying low volume audio (such as audio heard only in the proximity of a human ear) and high volume audio for hands free operation. The audio system 312 can further include a microphone for receiving audible signals from an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location detector 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such as Flash, ROM, RAM, SRAM, DRAM or other storage technologies.

The communication device 300 can be adapted to perform the functions of the media processor 106, the media devices 108, or the portable communication devices 116 of FIG. 1, as well as IMS CDs and PSTN CDs. It will be appreciated that the communication device 300 can also represent other common devices that can operate in communication system 100 of FIG. 1 such as a gaming console and a media player.

Figure 4:
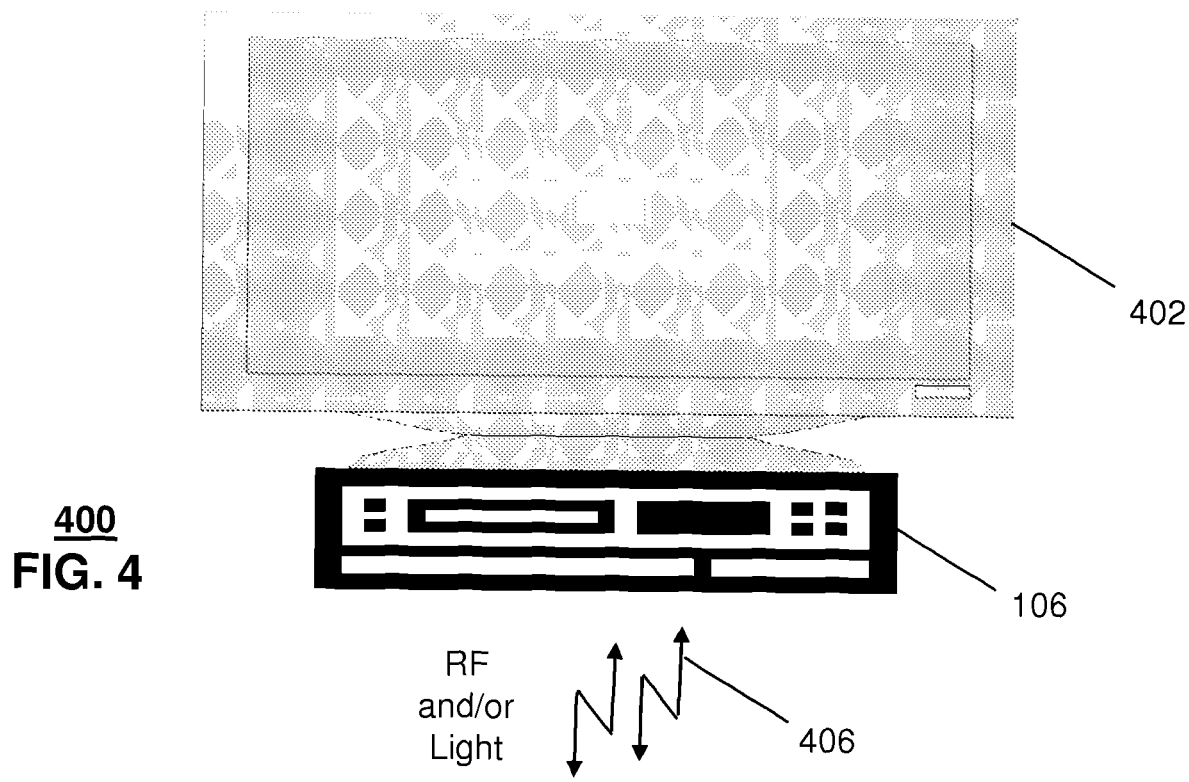
FIG. 4 depicts an illustrative embodiment of a presentation device and media processor for presenting media content.

FIG. 4 depicts an illustrative embodiment 400 of a presentation device 402 and a media processor 106 for presenting media content. In the present illustration, the presentation device 402 is depicted as a television set. It will be appreciated that the presentation device 402 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 402 to emit images associated with media content. It is further noted that the media processor 106 and the presentation device 402 can be an integral unit. For example, a computer or cellular phone having computing and display resources collectively can represent the combination of a presentation device 402 and media processor 106.

Figure 5:
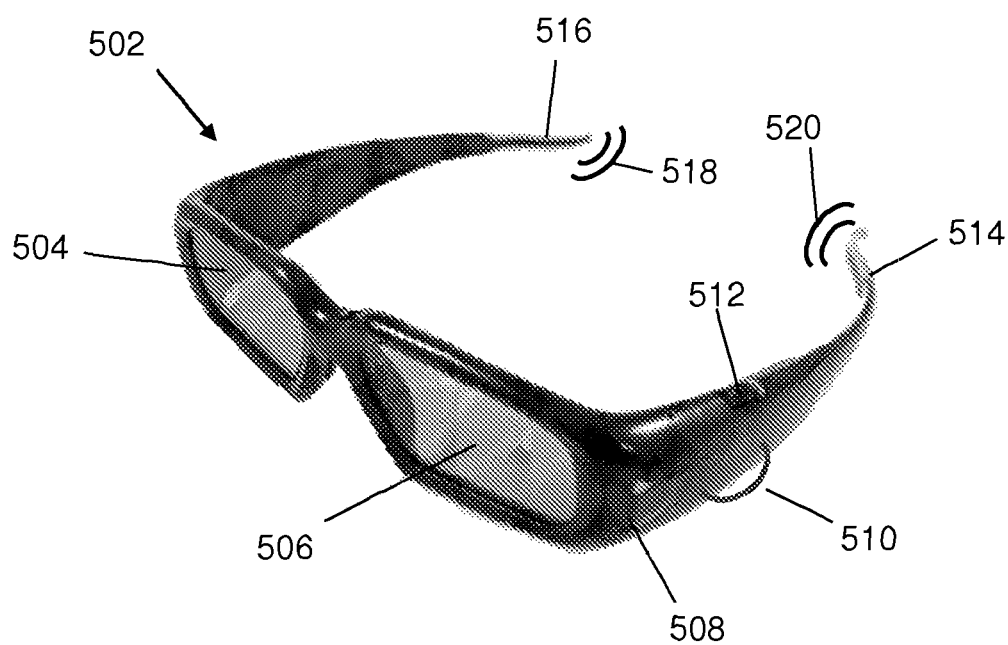
FIG. 5 depicts an illustrative embodiment of a viewing apparatus.

The media processor 106 can be adapted to communicate with accessories such as the viewing apparatus 502 of the illustrative embodiment 500 depicted in FIG. 5 by way of a wired or wireless interface, including through use of signals 406 from the media processor 106. The communication can be one-way and/or two-way communication, such as providing the viewing apparatus 502 with a transceiver. A wired interface can represent a tethered connection from the viewing apparatus to an electro-mechanical port of the media processor 106 (e.g., USB or proprietary interface). A wireless interface can represent a radio frequency (RF) interface such as Bluetooth, WiFi, ZigBee or other wireless standard. The wireless interface can also represent an infrared communication interface. Any standard or proprietary wireless interface between the media processor 106 and the viewing apparatus 502 is contemplated by the presented disclosure.

The viewing apparatus 502 can represent an apparatus for viewing two-dimensional (2D) or 3D stereoscopic images which can be still or moving images. The viewing apparatus 502 can be an active shutter viewing apparatus. In this embodiment, each lens has a liquid crystal layer which can be darkened or made to be transparent by the application of one or more bias voltages. Each lens 504, 506 can be independently controlled. Accordingly, the darkening of the lenses 504, 506 can alternate, or can be controlled to operate simultaneously.

Each viewing apparatus 502 can include all or portions of the components of the communication device 300 illustrated in FIG. 3. For example, the viewing apparatus 502 can utilize the receiver portion of the transceiver 302 in the form of an infrared receiver depicted by the window 508. Alternatively, the viewing apparatus 502 can function as a two-way communication device, in which case a full infrared transceiver could be utilized to exchange signals between the media processor 106 and the viewing apparatus 502.

The viewing apparatus 502 can utilize a controller 306 to control operations thereof, and a portable power supply (not shown). The viewing apparatus 502 can have portions of the UI 304 of FIG. 3. For example, the viewing apparatus 502 can have a multi-purpose button 512 which can function as a power on/off button and as a channel selection button. A power on/off feature can be implemented by a long-duration depression of button 512 which can toggle from an on state to an off state and vice-versa. Fast depressions of button 512 can be used for channel navigation. Alternatively, two buttons can be added to the viewing apparatus 502 for up/down channel selection, which operate independent of the on/off power button 512. In another embodiment, a thumbwheel can be used for scrolling between channels.

The viewing apparatus 502 can also include an audio system 312 with one or more speakers in the extensions of the housing assembly such as shown by references 516, 520 to produce localized audio 518, 520 near a user's ears. Different portions of the housing assembly can be used to produce mono, stereo, or surround sound effects. Ear cups (not shown) such as those used in headphones can be used by the viewing apparatus 502 (as an accessory or integral component) for a more direct and low-noise audio presentation technique. The volume of sound presented by the speakers 514, 516 can be controlled by a thumbwheel 510 (or up/down buttons—not shown).

It would be evident from the above descriptions that many embodiments of the viewing apparatus 502 are possible, all of which are contemplated by the present disclosure.

Figure 6:
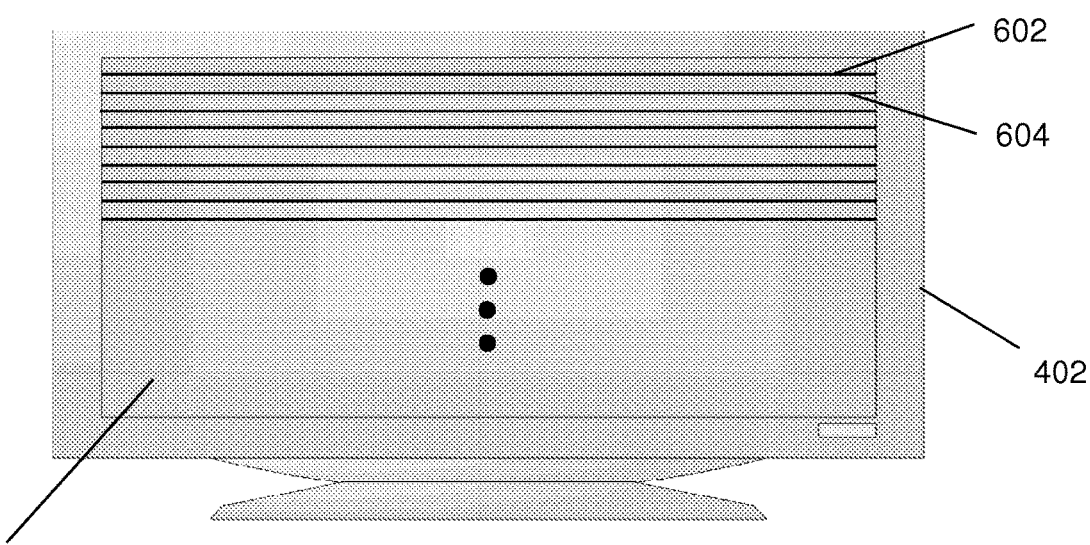
FIG. 6 depicts an illustrative embodiment of a presentation device with a polarized display.

FIG. 6 depicts an illustrative embodiment 600 of the presentation device 402 of FIG. 4 with a polarized display. A display can be polarized with well-known polarization filter technology so that alternative horizontal pixel rows can be made to have differing polarizations. For instance, odd horizontal pixels 602 can be polarized for viewing with one polarization filter, while even horizontal pixels 604 can be polarized for viewing with an alternative polarization filter. The polarization can be based on other pixel patters, such as vertical pixel columns and so forth. The viewing apparatus 502 previously described can be adapted to have one lens polarized for odd pixel rows, while the other lens is polarized for viewing even pixel rows. With polarized lenses, the viewing apparatus 502 can present a user a 3D stereoscopic image.

FIG. 7 depicts an illustrative embodiment of a pair of left and right eye frames 710, 720 of 3D image content 700. There is only minimal difference between the images depicted in the two frames 710, 720 since the cameras producing the two frames are focused on the same scene and are separated by only a few inches. In one exemplary embodiment, selected columns of pixels from left eye frame 710 can be interspersed in an alternating fashion with selected columns of pixels from right eye frame 720 (e.g., horizontal interlacing) such that every alternate column belongs to frame 710 or frame 720, creating a single, continuous frame 750 with characteristics of both the left and right eye frames. The resulting image frame 750 can have higher pixel-to-pixel correlation as compared to side-to-side compression in which a resulting frame includes both frames side-to-side after being compressed.

Figure 8:
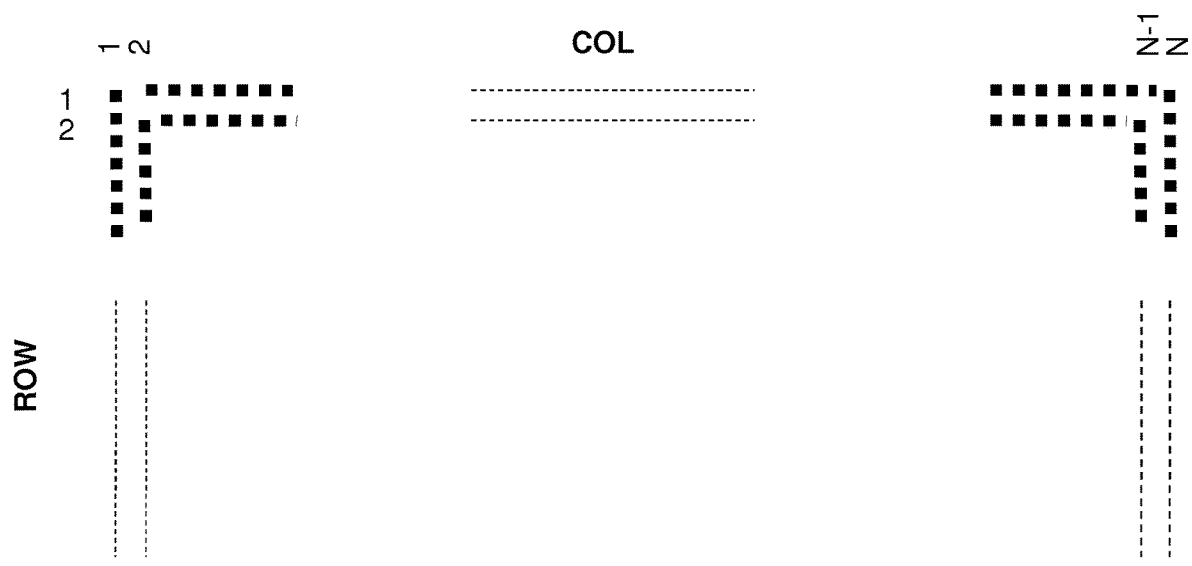
Figure 9:
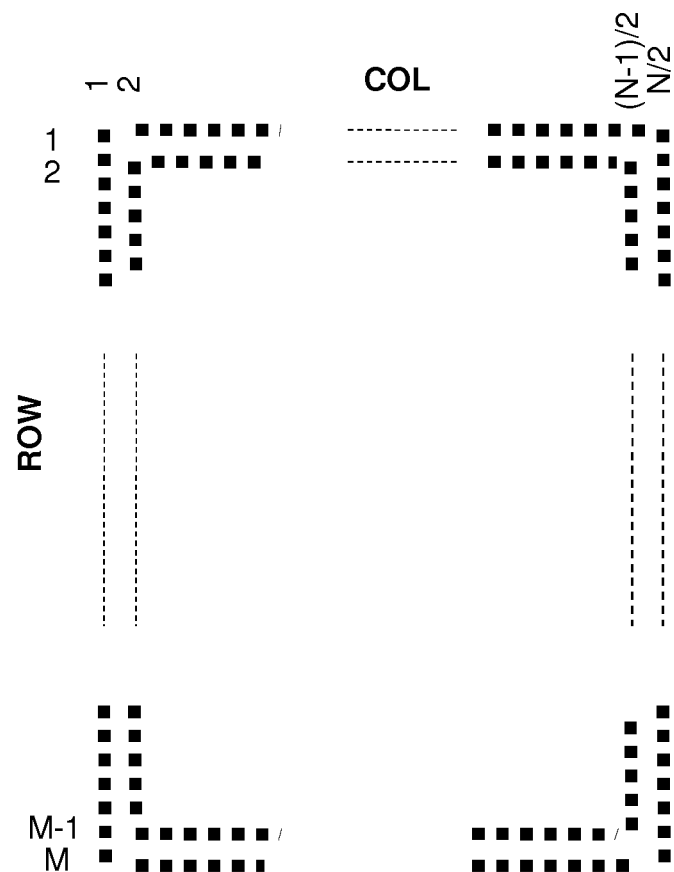

Referring to the pixel arrangements 800 and 900 of FIGS. 8 and 9, one exemplary embodiment of the pixel recombination algorithm is described. In the following embodiment, Lo and Ro are the original, full resolution Left and Right eye frames. Ls and Rs are the filtered, re-sampled half-resolution left and right eye frames. The pixel arrangement 800 is the full-frame resolution pixel arrangement for Lo and Ro and depicts the pixel elements where the Y-axis is rows 1–M and the X-axis is columns 1–N. The pixel arrangement 900 is the half-frame pixel arrangement for Ls and Rs where (XLi, YLj) is the pixel element (i, j) of half-frame Ls and (XRi, YRj) is the pixel element (i, j) of the half-frame Rs, where i is (1–n) and j is (1–m), and where n is (N/2) and m is M. For example, N=1920 and M=1080 for 1080i and 1080P formats or N=1280 and M=720 for 720P format.

The combined frame can be assembled as a matrix of elements as shown in the interleaving pixel arrangement of Ls and Rs frames of Table 1:

| COL1 | (XR1, YR1), (XR1, YR2), | ... | (XR1, YRm − 1), (XR1, YRm) |
| COL2 | (XL1, YL1), (XL1, YL2), | ... | (XL1, YLm − 1), (Yl, YLm) |
| COL3 | (XR2, YR1), (XR2, YR2), | ... | (XR2, YRm − 1), (XR2, YRm) |
| \| | \| | \| | \| |
| COL [n − 1] | (XRn − 1, YR1), (XRn − 1, YR2), | ... | (XRn − 1, YRm − 1), (XRn − 1, YRm) |
| COL [n] | (XRn, YR1), (XRn, YR2), | ... | (XRn, YRm − 1), (XRn, YRn) |

In this embodiment, each alternate column of Table 1 belongs to a different re-sampled frame (Rs or Ls) corresponding to a horizontal interlacing. In a side-side decoding mechanism, reconstruction of the side-side image at the decoder (e.g., a 3DTV or an STB) can be performed by reversing the process and recreating the two frames (Ro or Lo).

The recombining algorithm provides for efficient digital computation (e.g., integer arithmetic). In one embodiment, the recombining algorithm can be incorporated into a field programmable gate array, such as in a 3DTV or STB.

In one embodiment the exemplary methods described herein can be utilized with any pixel packing technique that separates left and right eye frames (or images) into separate panels (side-side, top-bottom, and so forth). For example, the exemplary methods can create a single image with extended edges creating an overall image whose pixels are more closely correlated and will produce improved compression gains when encoded.

Figure 10:
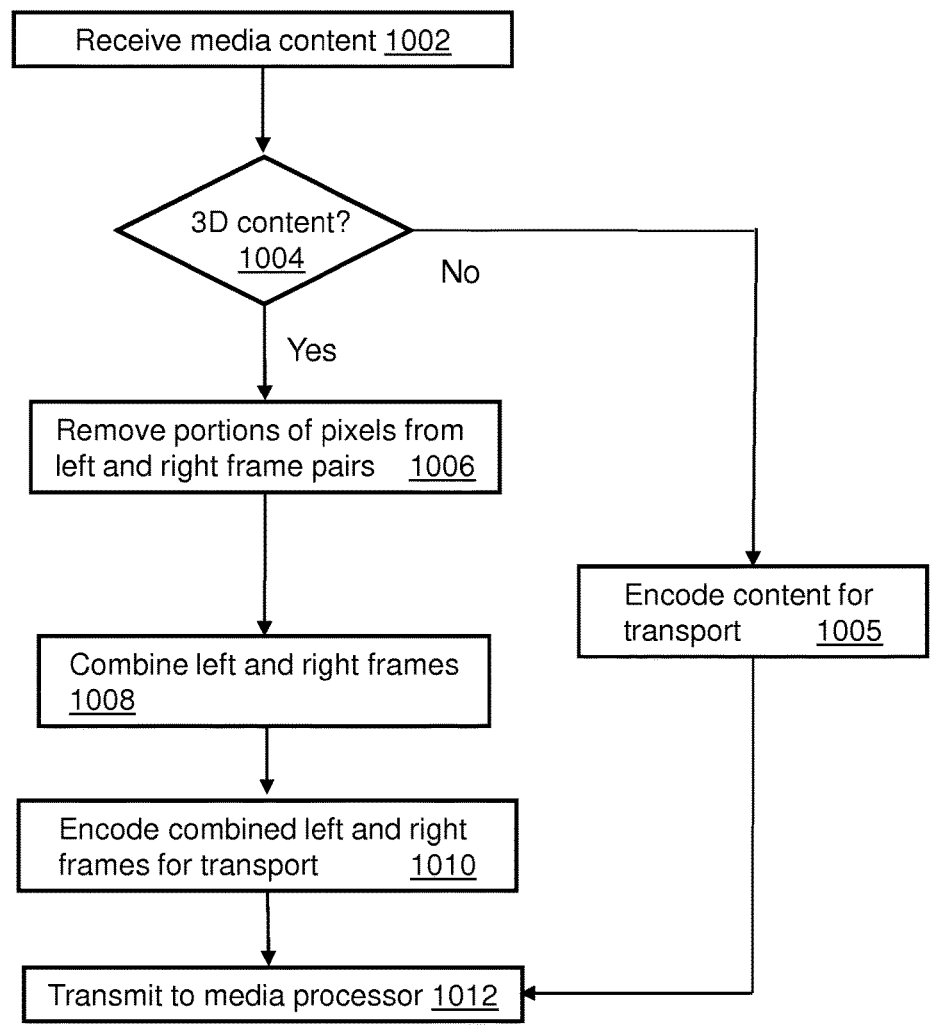
FIG. 10 depicts an illustrative embodiment of a method operating in portions of the devices and systems of FIGS. 1-6 using the media content of FIGS. 7-9.

FIG. 10 depicts an illustrative embodiment of a method 1000 operating in portions of the devices and systems described herein and/or illustrated in FIGS. 1-9. Method 1000 can begin with step 1002 in which media content is received by computing devices 130. In step 1004, the computing devices 130 can determine whether the media content is 3D content or 2D content. If the content is 2D content then the computing devices 130 in step 1005 can encode the 2D content and transmit the media content in step 1012.

If on the other hand, the media content is 3D content then in step 1006 selected portions of pixels from each of the left and right eye frames can be removed. The portions of pixels that are removed can be based on a number of factors and can be in a number of different patterns. For instance, one or more rows and/or columns of pixels can be removed from each of the left and right eye pairs. In another embodiment, alternating rows and/or alternating columns of pixels can be removed from each of the left and right eye pairs. In yet another embodiment, the removals of the portion of pixels can be based on either or both of previous and subsequent pairs of frames. The removal of a portion of the pixels can be based on filtering and re-sampling techniques, including along the horizontal, vertical and/or diagonal directions.

In one embodiment, the filtering and re-sampling can be applied equally to both the left and right eye frame pairs. For instance, the filtering and re-sampling can be applied to the left eye frame to determine which pixels are to be removed. Rather than re-applying filtering and re-sampling to the corresponding right eye frame, in one exemplary embodiment, the computing devices 130 can remove the same pixels (e.g., based on a position of the pixels within a shared coordinate system of the frame pairs) from the right eye frame. The present disclosure also contemplates removal of different pixels from the left and right eye frame pairs. For instance, the filtering and re-sampling can be applied equally to a portion of each of the left and right eye frames, such as a center region of the frames, but can be unequally applied along the outer regions of the frames.

In one embodiment, the filtering and re-sampling can be applied to reduce the left and right eye frames to half-resolution so that the left and right eye frames can be combined into the single transport frame. In another embodiment, the filtering and re-sampling can be applied to obtain other resolutions for the left and right eye frames. For example, first and second sets of left and right eye pairs can be filtered and re-sampled to quarter-resolution frames. All four frames can then be combined into the single transport frame, such as by having the columns or rows of pixels in the transport frame selected from each of the frames in a four-way alternating fashion, such as a pixel column arrangement in the transport frame of $1L_1 1R_1 2L_1 2R_1 1L_2 1R_2 2L_2 2R_2 1L_3 1R_3 2L_3 2R_3 \ldots$, where 1L and 1R are the first left and right eye frame pair and 2L and 2R are the second left and right eye frame pair, and where the subscript is the column number in the first and second eye frame pairs.

In step 1008, the remaining pixels for each left and right eye pair can be combined into single frames. The plurality of single frames, which each include the remaining pixels from the corresponding left and right eye pairs of frames, can then be encoded in step 1010. The particular transport encoding can vary. For example, compression techniques, such as MPEG2, MPEG4-AVC, or other coding methods that use frequency transforms (e.g., discrete cosine transform and others), can be applied to the plurality of frames. In one embodiment, the compression techniques can include those which allow for the resulting coefficients to be quantized based on quasi polynomial factor and rate control algorithms, as well as motion compensation.

Once encoded, the plurality of frames can be transmitted to the media processor for display of the 3D content on a display device. The transmission can be based on multicast, unicast and/or broadcast.

In one embodiment, if the display device is incapable of presenting 3D content then each of the plurality of frames can be processed by the media processor 106 to remove either the left or right eye pixels from the single frame. Interpolation or other imaging techniques can be utilized to generate and replace the removed pixels.

If on the other hand the display device is capable of presenting the 3D content and such a presentation is desired then the media processor 106 (such as the STB's) can generate the 3D content based on the left and right eye pixels in each of the single frames that can be utilized for generating left and right eye frame pairs. In one embodiment, the techniques used to remove select portions of pixels during the filtering and re-sampling process can also be utilized by the media processor 106 to add pixels to each of the left and right eye frame pairs. Various other techniques are contemplated for adding pixels to the left and right eye frame pairs, including interpolation based on previous and or subsequent pairs of frames, as well as based on other pixels within the same left and right eye frames.

The left and right eye frame pairs can then be sequentially presented at the display device and viewed utilizing active shutter glasses. In another embodiment, the left and right pairings can be combined but oppositely polarized and viewed utilizing polarized glasses. The exemplary embodiments contemplate other techniques for generating the three-dimensional content from the two-dimensional content and the depth map. The particular methodology employed to provide or render the three-dimensional image content can vary and can include active shutter (alternate frame sequencing), polarization and other techniques. The media content map can be received by the media processor from various sources, such as via a broadcast over an IPTV network, cable, DBS and so forth.

The exemplary embodiments contemplate a viewing apparatus (such as active shutter glasses or passive polarization glasses) being detected through various means. The detection can be performed by the media processor, although other devices can also be utilized for this purpose as well. The detection can be based upon a number of thresholds, including recognizing that a viewer is wearing the viewing apparatus; detecting that the viewing apparatus is in a line of sight with a display device upon which the media content is or will be displayed; and determining that the viewing apparatus is within a pre-determined distance of the display device. The techniques and components utilized for detecting the viewing apparatus can vary. For example, the media processor can scan for the presence of the viewing apparatus. This can include two-way communication between the media processor and the viewing apparatus. In one embodiment, the viewing apparatus can emit a signal which is detected by the media processor. Presence and/or distance can be determined based on the signal, including utilizing signal strength. Location techniques can also be used for determining a position of the viewing apparatus, including triangulation and so forth.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 800. For example, a cellular phone can be adapted to receive the plurality of transport frames and generate left and right eye frame pairs therefrom for presentation of 3D content.

In one embodiment, different frames or groups of frames can be subjected to different pre-encoding processes. For instance, one or more first pairs of frames can be combined using column interleaving where the resulting frame is arranged in pixel columns that are selected from the left and right eye pairs in an alternating fashion, while one or more second pairs of frames can be combined using row interleaving where the resulting frame is arranged in pixel columns that are selected from the left and right eye pairs in an alternating fashion.

In another embodiment, the alternating pattern of pixels can be non-uniform. For instance, the center area of the resulting frame can have a uniform pattern of alternating pixels selected from the left and right eye pairs where as one or more edges of the resulting frame can have a non-uniform pattern, such as having a series of columns or a series of rows selected from either the left eye frame or the right eye frame.

In another embodiment, the filtering and re-sampling of pixels to produce the left eye and right eye half-frames or other lower resolution versions of the left and right eye frames can be performed on selected portions of the left and right eye frames. For instance, a greater number of pixels can be removed near the outer regions of the left and right eye frames while maintaining more pixels in the center region of the left and right eye frames.

Other suitable modifications can be applied to the present disclosure without departing from the scope of the claims below. Accordingly, the reader is directed to the claims section for a fuller understanding of the breadth and scope of the present disclosure.

Figure 11:
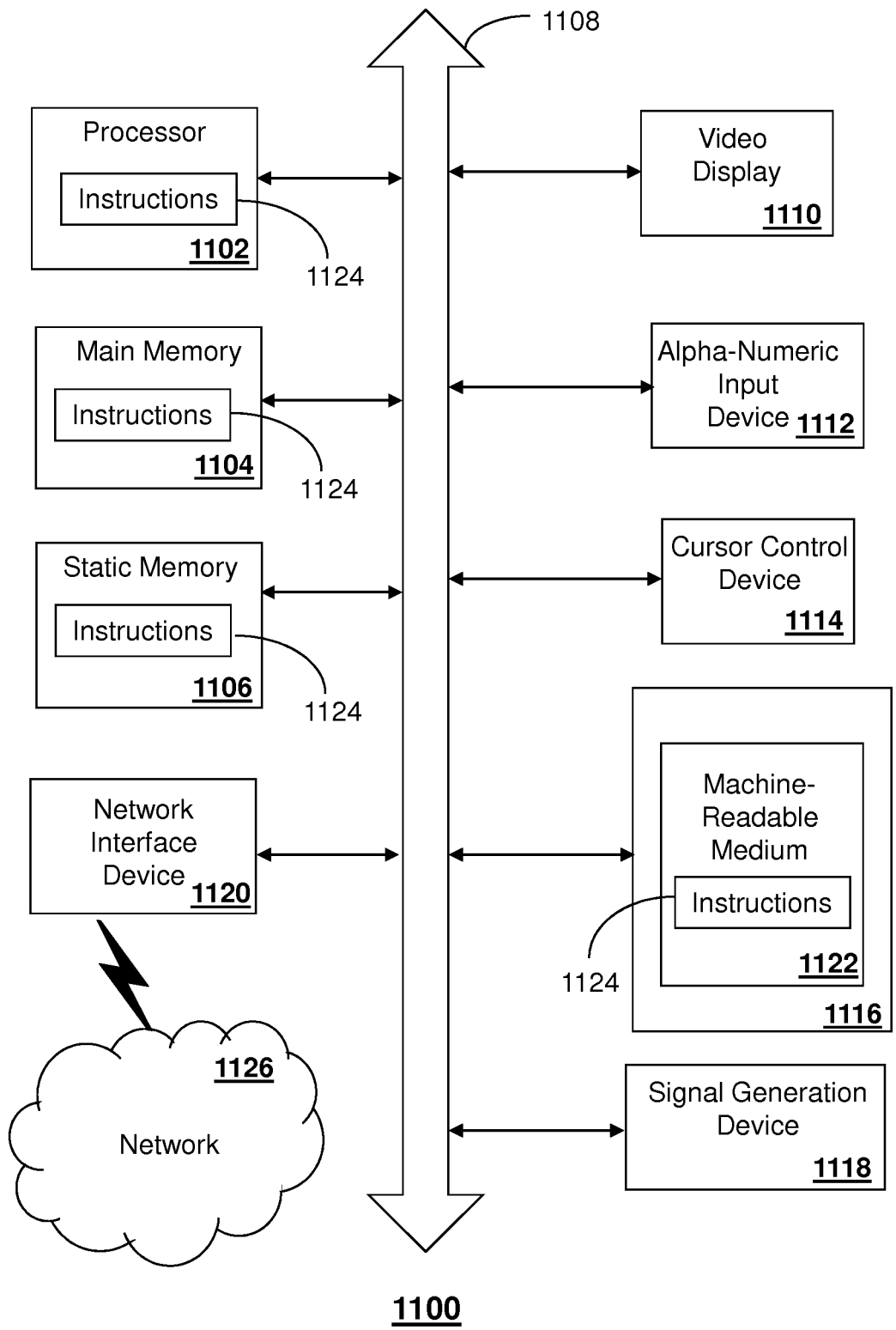
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory that stores executable instructions; and
a processing system including a processor coupled to the memory, wherein responsive to executing the executable instructions, the processing system facilitates performance of operations comprising:
receiving three-dimensional image content comprising a left-eye frame and a right-eye frame, wherein the left-eye frame comprises a first image comprising a first plurality of pixels and the right-eye frame comprises a second image comprising a second plurality of pixels, wherein the first image and the second image portray different perspectives of a common scene collectively forming a pair of images of the common scene;
arranging the first plurality of pixels of the first image and the second plurality of pixels of the second image according to a shared coordinate system;
generating a first remaining portion of pixels of the first plurality of pixels of the first image by removing a first portion of pixels filtered from the first plurality of pixels of the first image;
generating a second remaining portion of pixels of the second plurality of pixels of the second image by removing a second portion of pixels of the second plurality of pixels from the second image based on pixels that are correlated with the first remaining portion of pixels;
forming a transport frame by interlacing the first remaining portion of pixels and the second remaining portion of pixels; and
encoding the transport frame using a compression algorithm, wherein the encoded transport frame has a lower bitrate than encoded side-by-side frame comprising the first remaining portion of pixels and the second remaining portion of pixels using the compression algorithm, due to compression gains during the encoding of the transport frame from higher pixel-to-pixel correlation.

2. The device of claim 1, wherein the removing of the first portion of pixels comprises removing a column of pixels of the first plurality of pixels according to the shared coordinate system.

3. The device of claim 1, wherein the removing of the first portion of pixels comprises removing a row of pixels of the first plurality of pixels according to the shared coordinate system.

4. The device of claim 1, wherein encoding the transport frame uses a frequency transform.

5. The device of claim 1, wherein the removing of the first portion of pixels of the first plurality of pixels comprises re-sampling.

6. The device of claim 1, wherein the removing of the first portion of pixels of the first plurality of pixels comprises removing a first sub-portion of pixels of the first plurality of pixels from a center portion of the first image according to a uniform pattern, and
wherein the removing of the second portion of pixels comprises removing a second sub-portion of pixels of the first plurality of pixels from an outer portion of the first image according to a non-uniform pattern.

7. The device of claim 1, wherein the transport frame comprises an alternating pattern of pixels in an interleaving pattern based on one of alternating rows of pixels or alternating columns of pixels from the left-eye frame and the right-eye frame.

8. A non-transitory machine-readable storage device, comprising executable instructions that, when executed by a processing system including a processor, facilitate performance of operations comprising:
receiving image content comprising a first image comprising a first plurality of pixels and a second image comprising a second plurality of pixels, wherein the first image and the second image portray different perspectives of a common scene collectively forming a pair of images of the common scene, and wherein the first plurality of pixels of the first image and the second plurality of pixels of the second image are arranged according to a common coordinate system;
removing a first portion of pixels the first plurality of pixels from the first image based on a filtering of the first image, resulting in a first remaining portion of pixels;
removing a second portion of pixels the second plurality of pixels from the second image based on pixels that are correlated with the first remaining portion of pixels, resulting in a second remaining portion of pixels;
forming a transport frame by interlacing the first remaining portion of pixels and the second remaining portion of pixels in an interleaving pattern; and
encoding the transport frame using a compression algorithm, wherein the encoded transport frame has a lower bitrate than an encoded side-by-side frame comprising the first remaining portion of pixels and the second remaining portion of pixels using the compression algorithm, due to compression gains resulting from the encoding of the transport frame from higher pixel-to-pixel correlation.

9. The non-transitory machine-readable storage device of claim 8, wherein the encoding of the transport frame is based on a frequency transform.

10. The non-transitory machine-readable storage device of claim 8, wherein the filtering of the first image comprises removing one of a column of pixels of the first plurality of pixels or a row of pixels of the first plurality of pixels according to the common coordinate system.

11. The non-transitory machine-readable storage device of claim 8, wherein the removing of the first portion of pixels of the first plurality of pixels comprises re-sampling.

12. The non-transitory machine-readable storage device of claim 8, wherein the removing of the first portion of pixels of the first plurality of pixels comprises removing a first sub-portion of pixels of the first plurality of pixels from a center portion of the first image according to a uniform pattern.

13. The non-transitory machine-readable storage device of claim 8, wherein the transport frame comprises an alternating pattern of pixels based on one of alternating rows of pixels or alternating columns of pixels from the first image and the second image.

14. The non-transitory machine-readable storage device of claim 13, wherein one of a first alternating row and a second alternating row of the alternating rows of pixels are adjacent to each other or a first alternating column and a second alternating column of the alternating columns of pixels are adjacent to each other.

15. The non-transitory machine-readable storage device of claim 8, wherein the removing of the second portion of pixels comprises removing a second sub-portion of pixels of the first plurality of pixels from an outer portion of the first image according to a non-uniform pattern.

16. A method comprising:
  obtaining, by a processing system including a processor, three-dimensional image content comprising a first image comprising a first plurality of pixels and a second image comprising a second plurality of pixels, wherein the first image and the second image are arranged according to a shared coordinate system to portray different perspectives of a common scene and forming a pair of images of the common scene;
  removing, by the processing system, a first portion of pixels of the first plurality of pixels of the first image based on a filtering of the first image, resulting in a first remaining portion of pixels of the first plurality of pixels;
  removing, by the processing system, a second portion of pixels of the second plurality of pixels from the second image based on pixels that are correlated with the first remaining portion of pixels, resulting in a second remaining portion of pixels of the second plurality of pixels;
  forming, by the processing system, a transport frame by interlacing the first remaining portion of pixels with the second remaining portion of pixels in an interleaving pattern; and
  encoding, by the processing system, the transport frame using a compression algorithm, wherein the encoded transport frame has a lower bitrate than an encoded side-by-side frame comprising the first remaining portion of pixels and the second remaining portion of pixels using the compression algorithm, due to compression gains resulting from the encoding of the transport frame from higher pixel-to-pixel correlation.

17. The method of claim 16, wherein the transport frame is one of a plurality of transport frames of three-dimensional video content.

18. The method of claim 16, wherein the filtering of a center portion of the first image is different than the filtering of an outer portion of the first image.

19. The method of claim 18, wherein the filtering is applied equally to the center portion of the first image and unequally to the outer portion of the first image.

20. The method of claim 16, wherein the removing of the first portion of pixels of the first plurality of pixels comprises re-sampling.

* * * * *